United States Patent [19]
Alexander

[11] Patent Number: 6,161,289
[45] Date of Patent: Dec. 19, 2000

[54] WIRE STRIPPER APPARATUS

[76] Inventor: Leonard J. Alexander, 10804 N. 54th Cir., Glendale, Ariz. 85304

[21] Appl. No.: 09/280,930

[22] Filed: Mar. 29, 1999

[51] Int. Cl.⁷ .................................................. B21F 13/00
[52] U.S. Cl. ............................................. 30/90.1; 81/9.4
[58] Field of Search .................... 30/90.4, 90.6, 30/90.1, 90.2, 90.3; 81/9.4, 9.41, 9.42, 9.43, 9.44; 29/33 F; 83/947

[56] References Cited

U.S. PATENT DOCUMENTS

| | | | |
|---|---|---|---|
| 3,257,722 | 6/1966 | Caine | 30/90.1 |
| 4,317,279 | 3/1982 | Smith et al | 30/90.1 |
| 5,023,995 | 6/1991 | Kaplan | 30/90.1 |
| 5,577,150 | 11/1996 | Holder et al. | 30/90.4 X |

FOREIGN PATENT DOCUMENTS 2164212  3/1986  United Kingdom ...................... 81/9.4

*Primary Examiner*—Douglas D. Watts
*Attorney, Agent, or Firm*—H. Gordon Shields

[57] ABSTRACT

Wire stripping apparatus includes a block rotatable by either a drill element or a ratchet wrench element relative to wire being stripped includes at least a single bore which extends axially of the block. Communicating with the bore is a slot which holds a cutter blade. The cutter blade extends into the bore which receives the wire a depth sufficient to remove the insulation from the wire, leaving only the conductive core free from or stripped of the insulation. The depth of the bore and the location of the cutter blade determine the maximum length of the wire from which the insulation is stripped. The wire is thus fed into the wire stripping bore of the cylinder as the cylinder is rotated to easily and speedily remove the insulation.

10 Claims, 2 Drawing Sheets

WIRE STRIPPER APPARATUS

BACKGROUND OF THE INVENTION

1. Field of the Invention

This invention relates to apparatus for stripping insulation from wire and, more particularly, to a cylindrical wire stripper apparatus for removing insulation from underground cable of different sizes.

2. Description of the Prior Art

There are wire strippers in plier type configurations for stripping insulation from wires typically from size 10 wire and smaller. However, for underground cable, with wire sizes which are much larger than #10 wire, and accordingly cannot be accommodated conveniently with the prior art wire stripper apparatus.

There is known in the prior air a wire stripper element which includes a bore for receiving the wire, and the apparatus is hand rotated to remove the insulation from the wire.

The apparatus of the present invention includes a plurality of bores and cutters to allow the apparatus to be used in a drill or a ratchet for rotating the apparatus relative to the wire for stripping the insulation from the wire. Different size wires may be accommodated.

SUMMARY OF THE INVENTION

The invention described and claimed herein comprises a cylinder block having a plurality of axially extending bores dimensioned to receive insulated wire. Each bore receives a single size wire, and thus a single cylinder may accommodate several different size wires. Cutter elements extend through the cylinder and communicate with the bores for removing the insulation from a wire as the cylinder is rotated. The depth of the axial bores and the placement of the cutter blades determines how much insulation is removed. The length of the insulation removed is the amount typically required by linemen who are splicing wires or are otherwise appropriately securing the bare wires, as required. The cylindrical element includes two end faces, one end faces through which the axial bores extend and an opposite end face at which appropriate securing elements are disposed for use either in a drill or with a ratchet wrench. In the case of the drill, a pin extends outwardly and in the case of the use of a ratchet wrench, a square bore extends for receiving a meeting element on a ratchet wrench.

Among the objects of the present invention are the following:

To provide new and useful apparatus for stripping insulation from wire;

To provide new and useful wire stripping apparatus having a plurality of bores for accommodating different size wires from which insulation is to be stripped;

To provide a bore for receiving an insulated wire and a cutter blade communicating with the bore for removing insulation from wire;

To provide new and useful wire stripper apparatus including a bore for receiving wire and a cutter blade communicating with the bore and a connecting element for connecting the apparatus to a tool which rotates the apparatus to remove the insulation; and To provide new and useful apparatus having a plurality of axially extending bores and cutter blades communicating with the bores for stripping insulation from wires extending into the bores.

DESCRIPTION OF THE PREFERRED EMBODIMENT

Figure 1:
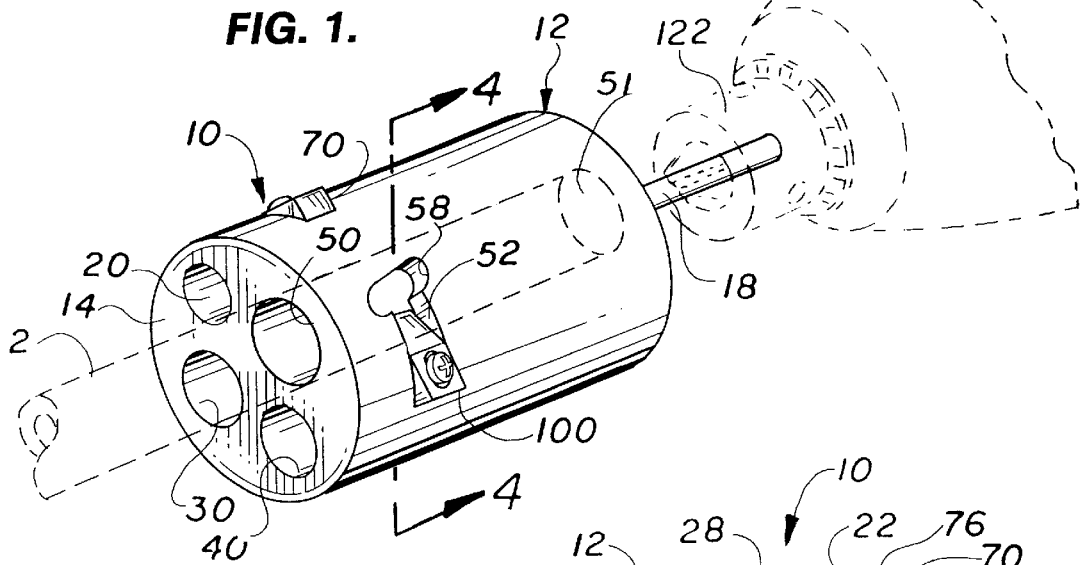
FIG. 1 is a perspective view of the apparatus of the present invention illustrating the use environment of the apparatus.
Figure 2:
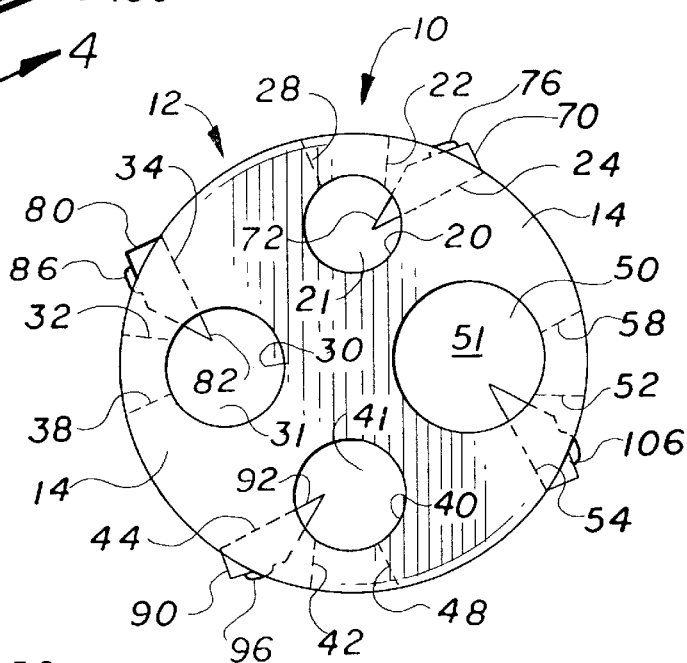
FIG. 2 is an end view of the apparatus of FIG. 1.
Figure 3:
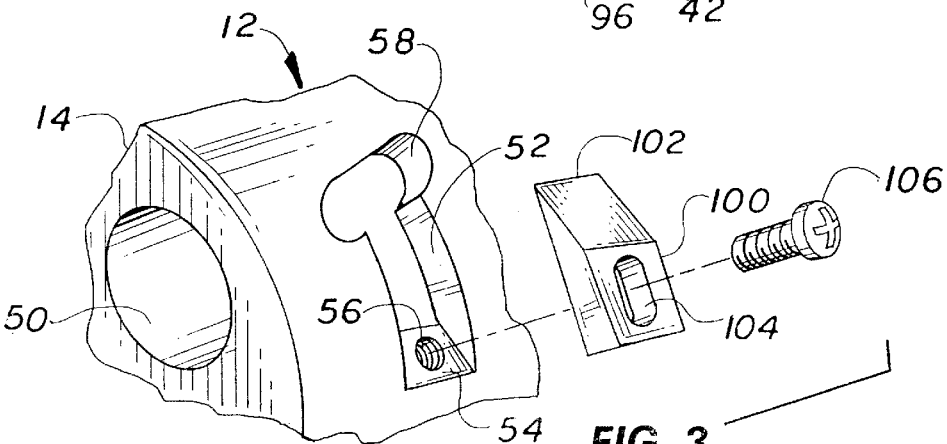
FIG. 3 is an exploded perspective view of a portion of the apparatus of the present invention.
Figure 4:
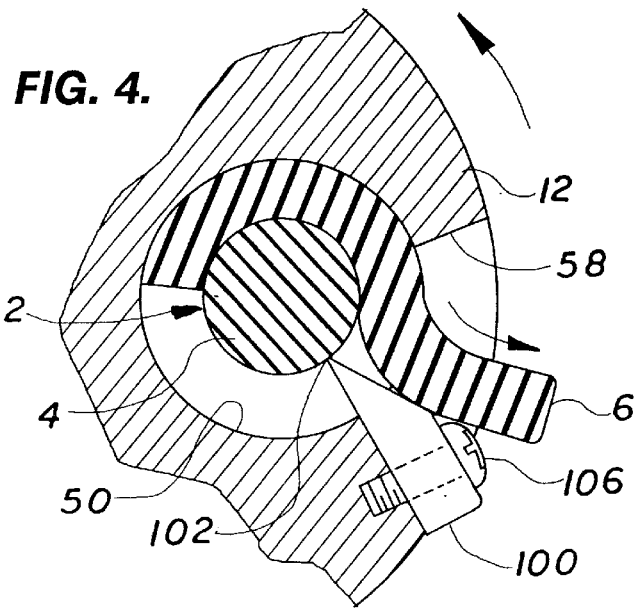
FIG. 4 is a view in partial section taken generally along line 4—4 of FIG. 1.
Figure 5:
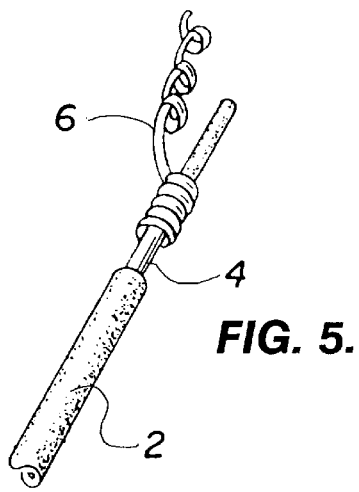
FIG. 5 is an exploded perspective view sequentially illustrating the operation of the apparatus of the present invention.

FIG. 1 is a perspective view of wire stripper apparatus of the present invention. The apparatus of the present invention includes a cylinder block 12 having a front end face 14. FIG. 2 is a front view of the end face 14 of the cylinder 12 showing four axially extending bores which receive wire from which insulation is to be stripped. FIG. 3 is an exploded perspective view of a portion of the apparatus of the present invention illustrating some of the elements associated therewith. FIG. 4 is a view in partial section illustrating the operation of the apparatus of the present invention, and FIG. 5 is a view of wire 2 from which insulation is stripped, illustrating the operation of the apparatus 10 and particularly the stripping of the wire 2 as illustrated in FIG. 4. For the following discussion, reference will primarily be made to FIGS. 1, 2, 3, 4, and 5.

The wire stripper apparatus 10, as indicated above, includes a cylindrical block or cylinder 12 with a pair of end faces 14 and 16. The end face 14 is a front end face, and the end face 16 is a rear end face. Extending outwardly from the real end face 16 is a pin 18, shown in both FIG. 1 and FIG. 6.

Four axial bores 20, 30, 40, and 50 are shown extending inwardly into the cylinder 12 from the front end face 14. The axial bores 20, 30, 40, and 50 are each of a different diameter for receiving wire of different sizes. The bores include end walls in the cylinder 12, and the end walls define the depth of the bores. The axial bore 20 includes an end wall 21, the axial bore 30 includes an end wall 31, the axial 40 includes an end wall 41, and the axial bore 50 includes an end wall 51.

Extending into the cylinder 12 and communicating with the axial bores are cutter slots, including a cutter slot 22, a cutter slot 32, a cutter slot 42, and a cutter slot 52. The cutter slots communicate respectively with the bores 20, 30, 40, and 50. Each cutter slot includes a shelf portion on which there is a tapped aperture. Thus, the cutter slot 22 includes a shelf portion 24 and a tapped aperture 26. The cutter slot 32 includes a shelf portion 34 and a tapped aperture 36. The cutter slot 42 includes a shelf portion 44 and a tapped aperture 46, and the cutter slot 52 includes a shelf portion 54 and a tapped aperture 56. The cutter slots also include enlarged end portions remote from the shelf portions. There is an end portion 28 for the cutter slot 22, an end portion 38 for the cutter slot 32, an end portion 48 for the cutter slot 42, and an end portion 58 for the cutter slot 52.

Cutter blades are disposed on the shelf portions and are held thereto by screws which extend into the tapped apertures. The cutter blades are all the same size, and accordingly the cutter slots and their respective portions of elements are similarly the same size. A cutter blade 70 which includes an edge 72 extends into the cutter slot 22. Tile cutter blade 70 includes a slot 74 through which a screw 76 extends. The screw 76 extends into the tapped aperture 26.

The cutter blade 80 includes an edge 82 and a slot 84 through which a screw 86 extends. The cutter blade 80 extends into the cutter slot 32 and is disposed on the shelf, with the screw 86 extending into the tapped aperture 36. A cutter blade 90 includes an edge 92, a slot 94, and a screw 96. The cutter blade 90 is disposed on the shelf 44 and the screw 96 extends to the slot 94 and into the tapped aperture 46. A cutter blade 100 includes an edge 102 and a slot 206 through which extends a screw 106. The cutter blade 100 is disposed on the shelf 54 and the screw 106 extends into the lapped aperture 56.

Figure 6:
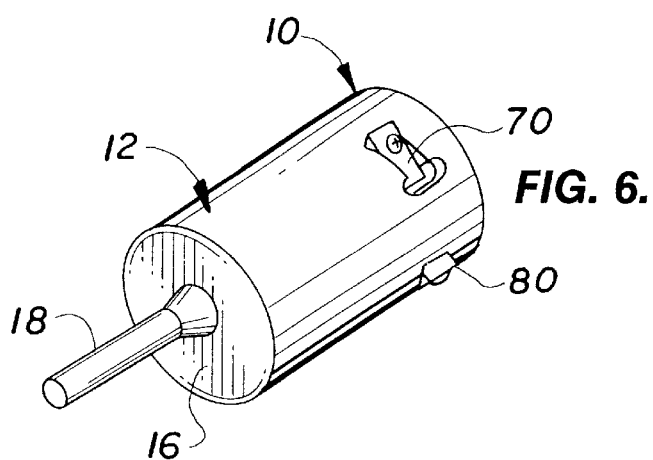
FIG. 6 is a perspective view of one embodiment of the apparatus of the present invention.
Figure 7:
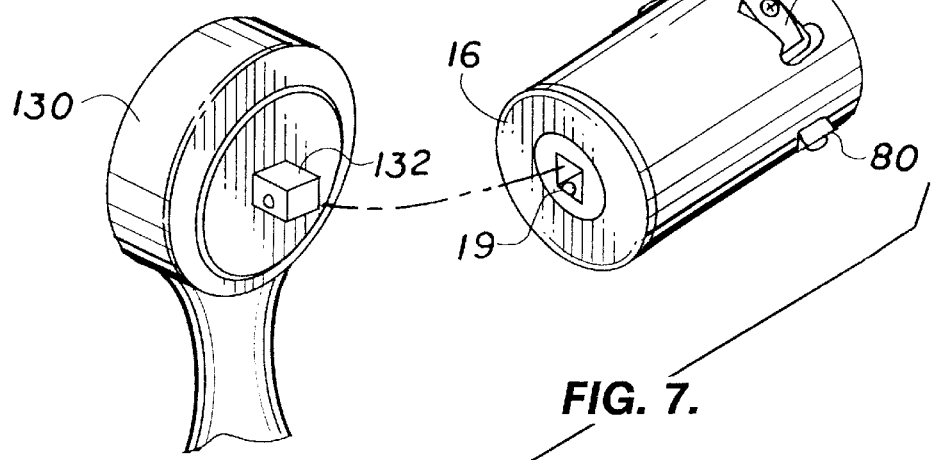
FIG. 7 is a perspective view of another embodiment of the apparatus of the present invention illustrating its operation.

The edges 72, 82, 92, and 102 extend through the cutter slots and into the axial bores, as best shown in FIG. 4. The depth of the edges, or the distance that the edges are disposed inwardly is sufficient to remove the insulation from a wire, but to not interfere with the conductive core of the wire itself. This is best illustrated in FIG. 4. A wire 2, which includes a conductive core 4 about which there is insulation 6 is shown in the bore 50 of the cylinder 12. The edge 102 of the cutter blade 100 removes the insulation 6 which extends outwardly through the end portion 58 and out of the cylinder 12. Thus, the conductive core 4 remains in tact but free of, or stripped of, the insulation 6. FIG. 6 illustrated how the insulation 6 is removed in a ribbon from the core 4.

FIG. 6 comprises a perspective view of the apparatus 10 showing the rear end face 16 of the cylinder 12 with the pin 18 extending outwardly therefrom. The pin 18 may be inserted into the chuck 122 of an electric drill 120, illustrated in FIG. 1. When the drill is actuated, the cylinder 12 rotates. The end of a wire 2 inserted into the bore 50 will first engage the insulation 6. As the drill is rotated, and as the wire 2 is pushed inwardly, the insulation 6 will be removed in a ribbon, as shown in FIG. 5, until the conductive core reaches the end wall 51. At such time, the drill 120 may be stopped, and the wire 2 may then be removed from the bore 50. The wire 2 will then have a predetermined length of the conductive core 4 extending outwardly from the insulated portion for appropriate handling, as desired, as with either splicing to another wire or fastened to an appropriate electrical element, as desired or as required.

An alternative to the use of the pin 18 and a drill 120 is the use of a ratchet wrench 130, with its square drive 132. The square drive element 132 extends into a square socket bore 19 of the cylinder 12 to rotate the cylinder 12 relative to the wire 2 by means of the ratchet wrench 130.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Apparatus for stripping insulation from wire comprising in combination:

a block;

bore means extending into the block for receiving insulated wire to be stripped, including a plurality of generally parallel bores, each of which has a different diameter for receiving wire having different diameters;

cutter means communicating with the bore means for stripping insulation from the wire; and means for rotating the block to strip the wire, including a pin for securing the block to a drill.

2. The apparatus of claim 1 in which the cutter means includes a plurality of slots communicating with the plurality of bores.

3. The apparatus of claim 2 in which the cutter means further includes a plurality of cutter blades disposed in the plurality of slots for stripping insulation from insulated wires disposed in the plurality of bores.

4. The apparatus of claim 3 in which the block comprises a cylinder having a first end and a second end, and the plurality of bores extend into the cylinder from the first end.

5. The apparatus of claim 4 in which the means for rotating the block is disposed at the second end of the cylinder.

6. Apparatus for stripping insulation from wire comprising in combination:

a block;

bore means extending into the block for receiving insulated wire to be stripped, including a plurality of generally parallel bores, each of which has a different diameter for receiving wire having different diameters;

cutter means communicating with the bore means for stripping insulation from the wire; and means for rotating the block to strip the wire, including a socket bore for securing the block to a ratchet wrench.

7. The apparatus of claim 6 in which the cutter means includes a plurality of slots communicating with the plurality of bores.

8. The apparatus of claim 7 in which the cutter means further includes a plurality of cutter blades disposed in the plurality of slots for stripping insulation from insulated wires disposed in the plurality of bores.

9. The apparatus of claim 8 in which the block comprises a cylinder having a first end and a second end, and the plurality of bores extend into the cylinder from the first end.

10. The apparatus of claim 9 in which the means for rotating the block is disposed at the second end of the cylinder.

\* \* \* \* \*